US012668269B2

(12) United States Patent
Käfer

(10) Patent No.: US 12,668,269 B2
(45) Date of Patent: Jun. 30, 2026

(54) METHOD FOR DETERMINING AN ACTION STRATEGY OF A VEHICLE DRIVING IN THE AUTOMATED DRIVING OPERATION

(71) Applicant: MERCEDES-BENZ GROUP AG, Stuttgart (DE)

(72) Inventor: Eugen Käfer, Renningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 90 days.

(21) Appl. No.: 18/293,026

(22) PCT Filed: Jun. 28, 2022

(86) PCT No.: PCT/EP2022/067676
§ 371 (c)(1),
(2) Date: Jan. 29, 2024

(87) PCT Pub. No.: WO2023/006317
PCT Pub. Date: Feb. 2, 2023

(65) Prior Publication Data
US 2024/0343266 A1    Oct. 17, 2024

(30) Foreign Application Priority Data

Jul. 30, 2021    (DE) ..................... 10 2021 003 918.1

(51) Int. Cl.
*B60W 60/00* (2020.01)
*B60W 30/18* (2012.01)
(52) U.S. Cl.
CPC .... *B60W 60/001* (2020.02); *B60W 30/18163* (2013.01); *B60W 60/0053* (2020.02); *B60W 2554/4045* (2020.02); *B60W 2556/65* (2020.02)

(58) Field of Classification Search
CPC ......... B60W 60/001; B60W 30/18163; B60W 60/0053; B60W 2556/65;
(Continued)

(56) References Cited

U.S. PATENT DOCUMENTS 6,694,233 B1 * 2/2004 Duff ..................... G05D 1/0246
73/178 R
7,576,661 B2 * 8/2009 Mochizuki ........... G08G 1/0104
340/995.13
(Continued)

FOREIGN PATENT DOCUMENTS

CN        107544296 A  *  1/2018
CN        111319627 A        6/2020
(Continued)

OTHER PUBLICATIONS

DE-102024129810-B3 machine translation (Year: 2024).*
(Continued)

*Primary Examiner* — Angelina M Shudy
(74) *Attorney, Agent, or Firm* — PATENT PORTFOLIO BUILDERS PLLC

(57) ABSTRACT

A method for determining an action strategy of a vehicle driving in the automated driving operation when nearing a vehicle ahead which is stationary in its lane. The vehicle behind the stationary vehicle ahead stops and waits to restart its driving operation until the vehicle ahead starts up. If the vehicle is waiting for longer than a pre-determined waiting time, the vehicle initiates an overtaking maneuver to overtake the vehicle ahead, requests support via a teleoperator and/or transmits a request to take over a driving task to a vehicle user of the vehicle.

6 Claims, 2 Drawing Sheets

(58) Field of Classification Search

Figure 1:
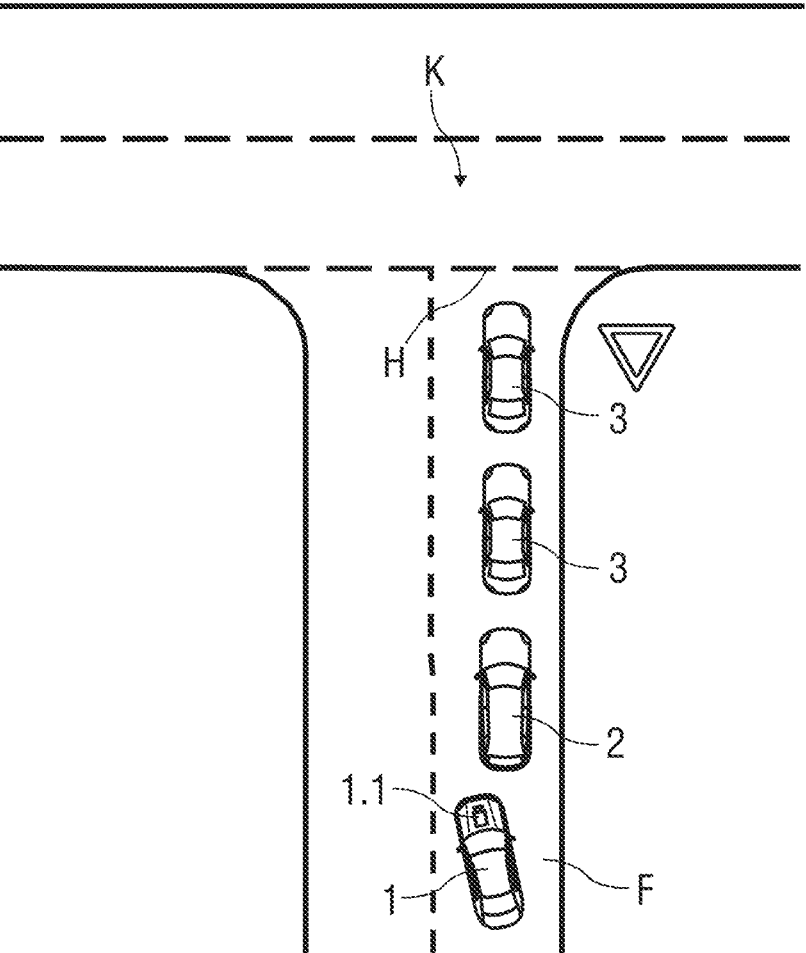

CPC ... B60W 2554/4045; B60W 30/18154; B60W 30/18159; G05D 1/00; G05D 1/0038; G05D 1/2247; G08G 1/00; H04W 4/40; G01C 21/00

See application file for complete search history.

(56) References Cited

U.S. PATENT DOCUMENTS

| | | | |
|---|---|---|---|
| 8,996,224 B1* | 3/2015 | Herbach | B60W 60/0011 |
| | | | 701/25 |
| 9,275,548 B2* | 3/2016 | Pink | G08G 1/16 |
| 9,442,489 B2 | 9/2016 | Reichel et al. | |
| 9,633,560 B1* | 4/2017 | Gao | G08G 1/07 |
| 9,818,299 B1* | 11/2017 | Jammoussi | G08G 1/161 |
| 10,074,273 B2* | 9/2018 | Yokoyama | G08G 1/0112 |
| 10,239,526 B2* | 3/2019 | Durgin | B60W 30/18154 |
| 10,248,116 B2 | 4/2019 | Okumura et al. | |
| 11,648,960 B2* | 5/2023 | Miura | B60W 30/18154 |
| | | | 701/26 |
| 11,651,681 B2* | 5/2023 | Kim | G08G 1/0112 |
| | | | 382/104 |
| 11,669,095 B2 | 6/2023 | Woltermann et al. | |
| 11,753,015 B2* | 9/2023 | Sujan | B60W 30/18163 |
| | | | 701/25 |
| 11,987,245 B2* | 5/2024 | Sakakura | G06V 20/584 |
| 12,077,158 B2* | 9/2024 | Kondo | B60W 30/16 |
| 12,246,719 B2* | 3/2025 | Nishimoto | B60W 30/18154 |
| 12,441,319 B2* | 10/2025 | Sujan | G08G 1/167 |
| 2002/0116118 A1* | 8/2002 | Stallard | G08G 1/082 |
| | | | 701/119 |
| 2003/0210806 A1* | 11/2003 | Yoichi | G01C 21/3647 |
| | | | 382/104 |
| 2004/0107048 A1* | 6/2004 | Yokota | G01C 21/343 |
| | | | 701/431 |
| 2004/0158390 A1* | 8/2004 | Mukaiyama | G01C 21/26 |
| | | | 701/400 |
| 2006/0167620 A1* | 7/2006 | Takagi | G08G 1/161 |
| | | | 701/519 |
| 2006/0244633 A1* | 11/2006 | Bahn | G08G 1/161 |
| | | | 340/902 |
| 2007/0171095 A1* | 7/2007 | Mochizuki | G08G 1/0104 |
| | | | 340/995.13 |
| 2007/0210359 A1* | 9/2007 | Lee | H10F 39/80 |
| | | | 257/290 |
| 2008/0172171 A1* | 7/2008 | Kowalski | G08G 1/065 |
| | | | 701/118 |
| 2009/0138189 A1* | 5/2009 | Kim | G08G 1/0104 |
| | | | 701/117 |
| 2010/0174474 A1* | 7/2010 | Nagase | G08G 1/01 |
| | | | 701/117 |
| 2012/0029730 A1* | 2/2012 | Nagura | G08G 1/096725 |
| | | | 701/2 |
| 2013/0013178 A1* | 1/2013 | Brant | G08G 1/0145 |
| | | | 701/117 |
| 2013/0110386 A1* | 5/2013 | Jin | B60W 40/06 |
| | | | 701/119 |
| 2014/0207325 A1* | 7/2014 | Mudalige | B62D 15/0255 |
| | | | 701/25 |
| 2014/0222280 A1* | 8/2014 | Salomonsson | B60R 1/26 |
| | | | 701/1 |
| 2014/0247160 A1* | 9/2014 | Glascock | G08G 1/095 |
| | | | 340/907 |
| 2014/0320316 A1* | 10/2014 | Peri | G08G 1/083 |
| | | | 340/907 |
| 2014/0330479 A1* | 11/2014 | Dolgov | G08G 1/167 |
| | | | 701/28 |
| 2014/0336912 A1* | 11/2014 | Pink | G08G 1/167 |
| | | | 701/117 |
| 2015/0042463 A1* | 2/2015 | Hiramatsu | B60W 40/09 |
| | | | 340/439 |
| 2015/0177007 A1* | 6/2015 | Su | G05D 1/0246 |
| | | | 701/25 |
| 2015/0286219 A1* | 10/2015 | Reichel | G08G 1/163 |
| | | | 701/23 |
| 2016/0133128 A1* | 5/2016 | Koo | G08G 1/0112 |
| | | | 701/117 |
| 2016/0229402 A1* | 8/2016 | Morita | G08G 1/166 |
| 2016/0288789 A1* | 10/2016 | Durgin | B60W 30/143 |
| 2016/0335892 A1* | 11/2016 | Okada | G08G 1/164 |
| 2017/0236413 A1* | 8/2017 | Takagi | G08G 1/095 |
| | | | 701/117 |
| 2017/0278390 A1* | 9/2017 | Zydek | B60W 30/00 |
| 2018/0057001 A1* | 3/2018 | Hu | G08G 1/0962 |
| 2018/0215386 A1* | 8/2018 | Naserian | F02D 41/0087 |
| 2018/0239358 A1* | 8/2018 | Choi | G05D 1/0212 |
| 2018/0273047 A1* | 9/2018 | Wang | B60W 10/18 |
| 2018/0314264 A1* | 11/2018 | Bhatia | G05D 1/0088 |
| 2019/0018419 A1* | 1/2019 | Lee | G08G 1/096708 |
| 2019/0071067 A1* | 3/2019 | Leone | F02D 29/02 |
| 2019/0137999 A1* | 5/2019 | Taguchi | B60W 30/0956 |
| 2019/0236952 A1* | 8/2019 | Suzuki | G08G 1/0133 |
| 2019/0250626 A1* | 8/2019 | Ghafarianzadeh | |
| | | | B60W 60/0027 |
| 2019/0276028 A1* | 9/2019 | Toda | B60W 50/0097 |
| 2019/0276029 A1* | 9/2019 | Umeda | G06V 20/584 |
| 2019/0278285 A1* | 9/2019 | Umeda | B60W 30/18154 |
| 2019/0279508 A1* | 9/2019 | Wang | G05D 1/0278 |
| 2020/0051427 A1* | 2/2020 | Katayama | G06V 20/58 |
| 2020/0122697 A1* | 4/2020 | Jang | B60T 8/172 |
| 2020/0135019 A1* | 4/2020 | Hirotsu | G08G 1/08 |
| 2020/0148210 A1* | 5/2020 | Naserian | B60L 7/18 |
| 2020/0160701 A1* | 5/2020 | Mobasser | G08G 1/0145 |
| 2020/0219197 A1* | 7/2020 | Fields | G08B 25/10 |
| 2020/0361488 A1* | 11/2020 | Miura | B60W 30/18159 |
| 2021/0009107 A1* | 1/2021 | Ries | G01S 17/931 |
| 2021/0016779 A1* | 1/2021 | Gillet | B60W 40/04 |
| 2021/0094567 A1* | 4/2021 | Imai | B60W 60/001 |
| 2021/0142660 A1* | 5/2021 | Huang | G08G 1/0145 |
| 2021/0253103 A1* | 8/2021 | Kumar | B60W 60/001 |
| 2021/0287024 A1* | 9/2021 | Taki | B60W 60/0015 |
| 2021/0316750 A1* | 10/2021 | Jo | B60W 30/18154 |
| 2021/0318684 A1* | 10/2021 | Woltermann | G05D 1/0214 |
| 2022/0214684 A1* | 7/2022 | Yoshinaga | G08G 1/096708 |
| 2022/0281455 A1* | 9/2022 | Sarlashkar | B60W 40/105 |
| 2022/0351615 A1* | 11/2022 | Sze | B60W 30/18154 |
| 2022/0392336 A1* | 12/2022 | Gaither | G08G 1/08 |
| 2022/0414388 A1* | 12/2022 | Fang | G06V 20/584 |
| 2023/0109372 A1* | 4/2023 | Ota | B60W 30/181 |
| | | | 701/70 |
| 2023/0141328 A1* | 5/2023 | Nishimoto | B60W 30/18159 |
| | | | 701/93 |
| 2023/0278563 A1* | 9/2023 | Xiao | B60W 30/18163 |
| | | | 701/1 |
| 2024/0059292 A1* | 2/2024 | Perez Barrera | G08G 1/096775 |
| 2024/0140475 A1* | 5/2024 | Zeng | B60W 60/001 |
| 2024/0278782 A1* | 8/2024 | Kelkar | B60W 60/001 |
| 2024/0317227 A1* | 9/2024 | Baum | B60W 30/181 |
| 2024/0400055 A1* | 12/2024 | Lewandowski | B60W 60/001 |
| 2024/0416915 A1* | 12/2024 | Hayakawa | B60W 30/16 |
| 2025/0115279 A1* | 4/2025 | Stein | B60W 60/0015 |
| 2025/0187631 A1* | 6/2025 | Carlsson | B60W 60/0017 |
| 2025/0206286 A1* | 6/2025 | Liu | B60W 10/24 |
| 2025/0206356 A1* | 6/2025 | Gao | G08G 1/00 |
| 2025/0360947 A1* | 11/2025 | Izumi | B60W 60/00272 |

FOREIGN PATENT DOCUMENTS

| | | | | |
|---|---|---|---|---|
| CN | 111712829 B | | 9/2020 | |
| CN | 112639646 A | | 4/2021 | |
| CN | 114973661 A | * | 8/2022 | G08G 1/095 |
| DE | 102012021282 A1 | | 4/2014 | |
| DE | 102013208763 A1 | | 11/2014 | |
| DE | 102015118489 A1 | | 5/2016 | |
| DE | 102018004044 A1 | | 10/2018 | |
| DE | 102017218608 A1 | | 4/2019 | |
| DE | 102018006949 A1 | | 3/2020 | |
| DE | 102024129810 B3 | * | 11/2025 | G08G 1/096775 |
| EP | 3219568 A1 | | 9/2017 | |

(56)        References Cited

FOREIGN PATENT DOCUMENTS

JP      2010209961  A  *  9/2010
WO      2010099789  A1     9/2010
WO      2021059715  A1     4/2021

OTHER PUBLICATIONS

JP-2010209961-A machine translation (Year: 2010).*
CN-107544296-A machine translation (Year: 2018).*
CN-114973661-A machine translation (Year: 2022).*
CN107544296A Espacenet Description machine translation (Year: 2018).*
Office Action dated Jun. 20, 2024 in related/corresponding CN Application No. 202280052180.
International Search Report and Written Opinion mailed Oct. 31, 2022 in related/corresponding International Application No. PCT/EP2022/067676.
Office Action created Feb. 17, 2022 in related/corresponding DE Application No. 10 2021 003 918.1.

* cited by examiner

METHOD FOR DETERMINING AN ACTION STRATEGY OF A VEHICLE DRIVING IN THE AUTOMATED DRIVING OPERATION

BACKGROUND AND SUMMARY OF THE INVENTIONS

Exemplary embodiments of the invention relate to a method for determining an action strategy of a vehicle driving in the automated driving operation when nearing a vehicle ahead which is stationary in its lane.

A method for driverless operation of a vehicle is known from DE 10 2018 006 949 A1. When a blockade situation arises, a blockade duration is predicted in advance using a situation analysis. Support via a teleoperator is requested if the predicted blockade duration of the blockade situation is greater than a pre-determined duration or if the vehicle has waited for the blockade situation to be resolved for longer than the predicted duration.

Exemplary embodiments of the invention are directed to a method for determining an action strategy of a vehicle driving in the automated driving operation.

A method for determining an action strategy of a vehicle driving in the automated driving operation when nearing a vehicle that is stationary in its lane provides, according to the invention, that the vehicle stops behind the stationary vehicle ahead, and waits to continue its driving operation until the vehicle ahead starts up. If the vehicle is waiting for longer than a pre-determined waiting time, the vehicle initiates an overtaking maneuver to overtake the vehicle ahead, requests support by a teleoperator, and/or transmits a request to take over a driving task to a vehicle user of the vehicle.

By applying the method, the automated vehicle takes into account a queue at a junction, and waits there for an appropriate waiting time. The vehicle does not carry out an overtaking maneuver in relation to the vehicle ahead at first, i.e., during the waiting time, such that there is no risk for the vehicle of being stationary in traffic in the opposite direction, because further vehicles not recognized by the vehicle, which are waiting at the junction, are located in front of the vehicle ahead In one embodiment, the waiting time is pre-determined depending on a situation in the area surrounding the vehicle, for example such that when it is determined that no junction lies ahead of the vehicle and the vehicle ahead, it is assumed that the vehicle ahead is parking, and the vehicle then initiates an overtaking maneuver after the pre-determined waiting time has elapsed.

In a development of the method, a situation in the surrounding area is checked for a presence of indications which indicate that the vehicle ahead forms the end of a series of further vehicles which have come to a standstill, and said series is thus a queue, due to which the vehicle is stationary. The vehicle ahead is thus not driven around for this reason.

If, in a further embodiment, such indications are found, a correction value for the waiting time is determined depending on the indications found, and the waiting time for the vehicle is lengthened by the correction value. The vehicle thus joins the queue, and a takeover maneuver of the vehicle in relation to the vehicle ahead is not initiated, and the waiting time is situationally adjusted to the present indications.

In particular, according to one embodiment of the method, a distance of the vehicle from a junction is taken into account when determining the waiting time, wherein it is determined using this distance whether the vehicle ahead is stationary in a queue at the junction. If the vehicle ahead is stationary at the end of the series of further vehicles, the vehicle joins the queue, and an overtaking maneuver for taking over the vehicle ahead is not initiated.

A possible development provides that the waiting time is determined depending on the traffic information available to the vehicle. The traffic situation can thus contain a traffic jam warning, for example, such that the vehicle can adjust to a longer waiting time, optionally contacts the teleoperator and/or a vehicle user is requested to take over a driving task In a further possible embodiment, information on a length of the series of waiting further vehicles and/or a length of a predicted waiting time is transmitted to the vehicle via a vehicle-to-vehicle communication and/or via a vehicle-to-infrastructure communication. This predicted waiting time can then be stored in the vehicle. If it is recorded that the vehicle ahead does not start up after the predicted waiting time has elapsed, for example with the addition of a pre-determined buffer time, a request for present traffic information and/or information on the length of the series of further vehicles can be carried out again. Either the waiting time is corrected or the teleoperator is contacted and/or the takeover request is transmitted in the vehicle.

Exemplary embodiments of the invention are explained in more detail in the following with reference to drawings.

BRIEF DESCRIPTION OF THE DRAWING FIGURES

Figure 2:
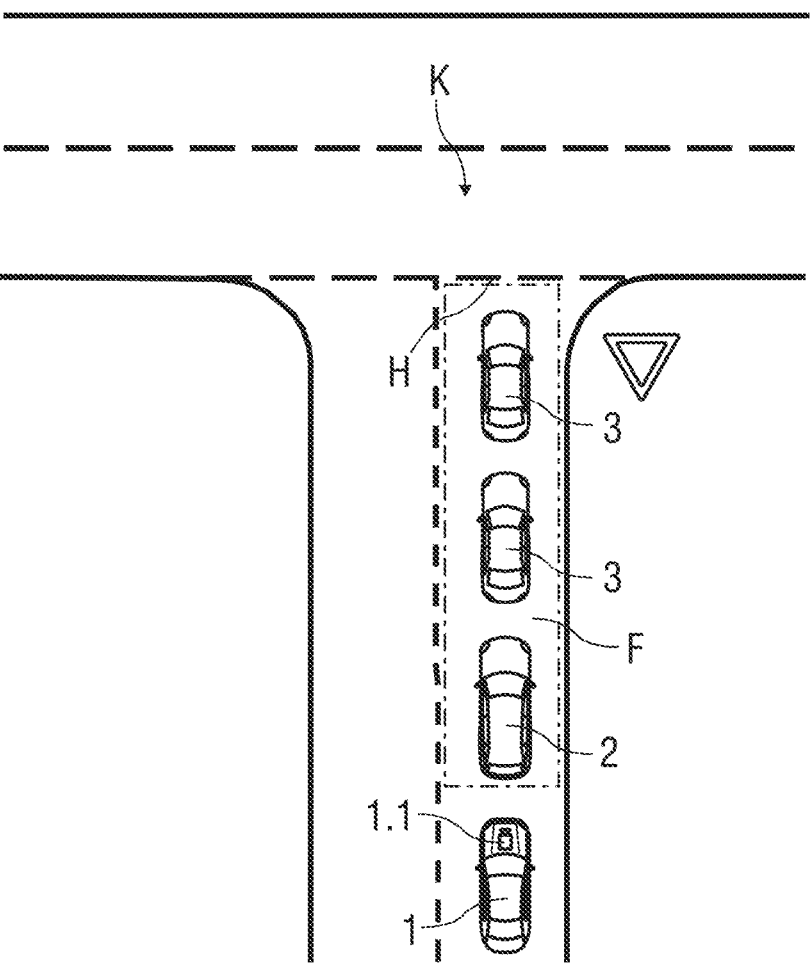

Here:

FIG. 1 schematically shows a traffic situation with a vehicle driving in the automated driving operation up to a queue at a junction and FIG. 2 schematically shows the traffic situation with the vehicle driving up to the queue in the automated driving operation while using a method according to the invention.

Parts corresponding to one another are provided with the same reference numerals in all figures.

DETAILED DESCRIPTION

FIG. 1 shows a traffic situation with a vehicle 1 driving in the automated driving operation, which is driving up to a vehicle 2 ahead that is stationary in its lane F, in front of which further vehicles 3 are located. The further vehicles 3 and the vehicle 2 ahead are stationary at a right-of-way controlled junction K, and are waiting to be able to pass the junction K.

The vehicle 1 thus drives up to the stationary vehicle 2 ahead and stops. The vehicle 1 usually waits until the vehicle 2 ahead starts up. If, however, a pre-determined waiting time is exceeded and the vehicle 2 ahead does not start up, the vehicle 1 automatically initiates an overtaking maneuver in order to drive past the vehicle 2 ahead, as is generally the case when a vehicle 2 ahead is stationary in an own lane F.

If the waiting time that the vehicle 1 waits behind the vehicle 2 ahead for the latter to start up is not situationally adjusted, problems can arise for the automated vehicle 1.

In particular at junctions K with a queue requiring longer waiting times, problems can arise for the vehicle 1 if, after the pre-determined waiting time has passed, the vehicle 1 intends to drive around the vehicle 2 ahead, because the waiting further vehicles 3 located ahead of the vehicle 2 ahead have not been recorded by the sensors of the vehicle 1. In this case, the vehicle 1 has overlooked the queue, initiates the overtaking maneuver and cannot get in front of the vehicle 2 ahead due to the stationary further vehicles 3, and can thus be located in the traffic driving in the opposite direction in some circumstances, and thus represent a significant traffic risk. For example, the vehicle 1 then tries to drive around the waiting further vehicles 3, which at the very least irritates vehicle drivers of the further vehicles 3 with regard to the vehicle 1.

In the following, a method for determining an action strategy of the vehicle 1 driving in the automated driving operation when nearing a vehicle 2 ahead that is stationary in its lane F is described. In particular, the method provides for handling the action strategy for driving around the vehicle 2 ahead individually.

In FIG. 2, the same traffic situation is depicted, in which the vehicle 1 drives up to the stationary vehicle 2 ahead.

In particular, when a vehicle 2 ahead is stationary, which the vehicle 1 is approaching, it is assumed for pre-determined distances of the vehicle 1 and/or the vehicle 2 ahead from a junction K that there is a queue.

The queue extends from the vehicle 2 ahead up to a stop line H at the junction K, at which a further vehicle 3 waits to let crossing traffic participants pass.

Using recorded signals of a sensor system 1.1 of the vehicle 1, it is impossible in some circumstances to totally and reliably recognize that further vehicles 3 are located in front of the stationary vehicle 2 ahead. For example, the further vehicles 3 can be covered for the sensor system 1.1 of the vehicle 1 by the vehicle 2 ahead.

For this reason, it is required that a situation in the area surrounding the vehicle 1 is checked for a presence of indications that indicate that the vehicle 2 ahead is the end of a queue, i.e., of a series of the further vehicles 3 which have come to a standstill.

The distance of the vehicle 1 and/or of the vehicle 2 ahead from the junction K represents a possible indication. In general, there is an increased probability of a queue at a comparatively low distance of the vehicle 1 from a junction K, at which right of way must be granted. By falling short of a pre-determined threshold in relation to the distance from a junction K, it is assumed that the vehicle 2 ahead and also the vehicle 1 are part of a queue. Higher waiting times are thus taken into account by the vehicle 1 without another measure being introduced. In such a case, a usual waiting time which a vehicle 1 waits for the vehicle 2 ahead to start up is corrected by a correction value, whereby the waiting time increases.

For example, in one embodiment of the method, the vehicle 1 can collect information about a length of the queue and the waiting times of fleet vehicles of a vehicle fleet to which the vehicle 1 belongs at junctions K. This information in relation to the length and waiting time is then used when approaching the stationary vehicle 2 ahead to determine whether it is a queue, and how long it can take until the vehicle 2 ahead starts up or until the vehicle 1 can pass the junction K.

For this purpose, the vehicle 1 can receive the corresponding information from a computer unit coupled with the vehicle 1 via data technology.

In an alternative or additional embodiment, the waiting time is determined depending on traffic information available to the vehicle 1. In particular, a length of the queue is determined using the traffic information, wherein this traffic information is, for example, transmitted to the vehicle 1 via a traffic service and/or map service. For this purpose, it can be provided that different current traffic densities are transmitted to the vehicle 1 in a color-coded form, and the traffic densities can be correspondingly displayed in the vehicle 1.

For example, the color red signals a traffic jam, so that it may be necessary to adjust to a longer waiting time. Traffic information made available by traffic services and/or map services can then even be sufficiently precise as to display such queues of vehicles 1 to 3 almost in real time.

According to the method, the assumption that the vehicle 2 ahead forms an end of a queue leads an overtaking maneuver of the vehicle 1 to be suppressed, in particular to the vehicle 2 ahead being driven around being suppressed, and thus not being initiated, according to a maximum waiting time. The vehicle 1 thus joins the potential queue. This waiting time would be longer, however, if the vehicle 1 had to differentiate whether the vehicle 2 ahead is just stopping or is parking.

If the vehicle 1 ahead has a driving behavior according to a stop and go situation, this additionally represents an indication to assume that the vehicle 2 ahead forms a previous end of a queue. The stop and go situation of the vehicle 2 ahead can also be seen as confirmation of the presence of a series of waiting further vehicles 3 ahead of the vehicle 1, and thus a queue.

In the event that the vehicle 1 inadvertently joins the queue behind a vehicle 2 ahead which is parking, and ahead of which further parking vehicles 3 are located, and the automated vehicle 1 is thus in a comparatively dead-end situation with regard to driving onwards, a teleoperator is contacted and the support of the latter is requested. The teleoperator then checks the present situation, and gives instructions to the vehicle 1, such that the latter can take up its driving operation again. It is required that the parked vehicle 2 ahead and the parked further vehicles 3 are recorded in a digital map as a parking series in the form of parking spaces ahead of a junction K, and marked accordingly. A hypothesis of parked vehicles 2, 3 is thus also called on in order to determine and apply an appropriate action strategy for the vehicle 1 in such a situation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining an action strategy of a vehicle driving in the automated driving operation when approaching a second vehicle ahead that is stationary in the second vehicle's lane, the method comprising:

stopping and waiting, by the vehicle behind the second vehicle, to restart the vehicle's driving operation until the second vehicle starts up or until a predetermined waiting time expires, wherein at least a distance of the vehicle from a junction is used to determine the predetermined waiting time;

determining, by the vehicle, that the distance from the junction is below a predetermined threshold;

estimating, by the vehicle responsive to the distance from the junction being below the predetermined threshold, that a series of further vehicles is located between the second vehicle and the junction, wherein vehicles of the series of further vehicles are not completely recognized by sensors of the vehicle when the vehicle is stopping and waiting;

determining, by the vehicle whether the predetermined waiting time expired; and responsive to determining that the predetermined waiting time expired, performing, by the vehicle an overtaking maneuver to overtake the second vehicle, request by the vehicle support via a teleoperator, or transmitting by the vehicle a request to take over a driving task to a vehicle user of the vehicle.

2. The method of claim 1, wherein the predetermined waiting time is further based on an environmental situation of the vehicle.

3. The method of claim 1, further comprising:
checking a traffic situation in a surrounding area of the vehicle for indications that the second vehicle forms an end of the series of further vehicles that have come to a standstill.

4. The method of claim 3, wherein, responsive to the presence of indications that indicate that the second vehicle forms an end of the series of further vehicles that have come to a standstill, the method further comprises:
determining a correction value for the predetermined waiting time depending on the indications; and
lengthening the predetermined waiting time by the determined correction value.

5. The method of claim 3, wherein, the predetermined waiting time is also determined depending on traffic information available to the vehicle.

6. The method of claim 3, further comprising:
receiving, by the vehicle via a vehicle-to-vehicle communication or via a vehicle-to-infrastructure communication, information on a length of the series of further vehicles or a length of a predicted waiting time.

* * * * *